United States Patent [19]
Kaes et al.

[11] 3,912,522
[45] Oct. 14, 1975

[54] SILVER CONTAINING, SEMICONDUCTIVE GLASS OF IMPROVED RESISTIVITY AND SECONDARY EMISSION AND PROCESS OF MAKING IT

[75] Inventors: Hans-Herbert Kaes, Wetzlar-Dorlar; Hans Staaden, Stockhausen, both of Germany

[73] Assignee: Ernst Leitz G.m.b.H., Wetzlar, Germany

[22] Filed: Jan. 25, 1974

[21] Appl. No.: 436,666

[30] Foreign Application Priority Data
Jan. 29, 1973 Germany............................ 2304216

[52] U.S. Cl................. 106/47 R; 252/518; 252/521
[51] Int. Cl.²........................................... C03C 3/00
[58] Field of Search......... 106/47 R, 47 Q; 252/518, 252/519, 521

[56] References Cited
UNITED STATES PATENTS

| | | | |
|---|---|---|---|
| 3,020,238 | 2/1962 | Manahaten | 106/47 R |
| 3,278,317 | 10/1966 | Blair et al. | 106/47 R |
| 3,294,700 | 12/1966 | Bedier et al. | 106/47 R |
| 3,328,181 | 6/1967 | Weidel | 106/47 R |
| 3,449,136 | 6/1969 | Carpentier et al. | 106/47 R |
| 3,518,209 | 6/1970 | Provance | 106/47 R |
| 3,520,831 | 7/1970 | Lodewijk | 106/47 R |
| 3,607,321 | 9/1971 | Yokota | 106/47 R |
| 3,740,241 | 6/1973 | Broemer | 106/47 R |
| 3,776,745 | 12/1973 | Trap | 106/47 R |
| 3,798,114 | 3/1974 | Chuatal | 106/47 R |

*Primary Examiner*—Patrick P. Garvin
*Assistant Examiner*—John F. Niebling
*Attorney, Agent, or Firm*—Erich M. H. Radde

[57] ABSTRACT

The silver containing, semiconductive glass according to the present invention has a resistivity between $10^6$ and $2 \cdot 10^{12}$ $\Omega$ . cm. and is characterized by a high secondary emission coefficient $\delta$ and superior resistance to weathering. It is essentially composed of a base glass system consisting of silver metaphosphate, aluminum metaphosphate, and vanadium pentoxide in specific proportions and may additionally contain barium metaphosphate, lead metaphosphate, barium oxide, and/or boron trioxide. It is useful as construction material for electron multiplier channels and electron multiplier channel plates and also for making glass ceramics by a subsequent annealing treatment.

20 Claims, 8 Drawing Figures

SILVER CONTAINING, SEMICONDUCTIVE GLASS OF IMPROVED RESISTIVITY AND SECONDARY EMISSION AND PROCESS OF MAKING IT

BACKGROUND OF THE INVENTION

1. FIELD OF THE INVENTION

The present invention relates to a novel glass with valuable special physical and chemical properties and more particularly to a glass which can be used as material for the manufacture of electron multiplier channels.

2. DESCRIPTION OF THE PRIOR ART

An electron multiplier channel combines the dynode arrangement and the resistance network of conventional photomultipliers and consists in principle of a resistance tube to the ends of which a direct current voltage of a few kilovolt is applied. If electromagnetic or corpuscular radiation of sufficient energy strikes the inner wall of such a resistance tube, electrons are produced which are accelerated by the electric field applied thereto and which with a sufficiently high secondary emission coefficient $\delta$ of the material of the resistance tube release secondary electrons in avalanche-like fashion (see FIG. 1). The maximum value of intensification or amplification is about $10^9$.

The electron multiplier channel is characterized by small dimensions and sturdiness and has already been used in space as radiation detector. Since the amplification is relatively independent of the absolute dimensions, the use of very thin channels is possible. If a very large number of such channels are sintered together in parallel position to each other, channel plates are obtained which are used as image converter and/or image intensifier.

From the foregoing there result the following requirements which must be satisfied by the inner wall of an electron multiplier channel:

1. Optimum resistivity between $10^8$ and $10^{12}$ $\Omega$. cm., since, on the one hand, with too low an electric conductivity, a sufficient number of electrons cannot continuously be supplied and because, on the other hand, with too high an electric conductivity, undesired heating of the material occurs.

2. The material of the inner wall must have a high secondary emission coefficient $\delta$ and, in addition, as smooth a surface as possible, since any irregularities result in field emission from which noise pulses result.

3. Especially for producing electron multiplier channels having very small channel diameters ($<10$ $\mu$m), the glass engineering properties of the material which are of importance for properly drawing capillaries, are a controlling factor.

Materials and processes for the production of electron multiplier channels are already known from the literature. Thus in the journal "Instr. and Experimental Techniques", vol. 4 (1960), page 611, it has been proposed to line the inner walls of small glass tubes with layers of magnesium oxide MgO and titanium dioxide $TiO_2$. From British Patent No. 1,239,687 it is furthermore known to produce semiconductive layers in glasses which contain lead Pb and bismuthum Bi, by superficial reduction. These known methods, however, do not yield stable and homogeneous layers. Furthermore, they fail in the region of extremely small channel diameters ($<5$ $\mu$m.). Finally, these known processes are difficult to reproduce.

Accordingly, the change was made to semiconductive glasses which, after drawing the capillaries, possess already certain of the desired properties, without having to be subjected to a special after-treatment.

Semiconductive glasses in accordance with the last-mentioned process are described, for instance, in British Patent No. 1,238,560. The glasses listed therein and having a base of vanadium pentoxide and boron trioxide $V_2O_5-B_2O_3$ or of boron trioxide, cerous oxide, and ferric oxide $B_2O_3-Ce_2O_3-Fe_2O_3$ lead, however, to difficulties with respect to glass technology due to their relatively great tendency towards crystallization (see H.J.L. Trap in "Symp. Electrotechn. Glasses, Soc. Glass Techn." London, October 1970). Furthermore, such glasses are not optimized with respect to the secondary emission. In addition, these glasses are of poor resistance to weathering because of the relatively high proportion of boric acid present therein.

SUMMARY OF THE INVENTION

It is one object of the present invention to avoid the disadvantages of the known semiconductive glasses and to provide weather-resistant glasses of high secondary emission and stable resistance values.

Another object of the present invention is to provide a simple and effective process of producing such improved glasses.

Still another object of the present invention is to provide electron multiplier channels or electron multiplier channel plates being composed or consisting of such improved glasses.

Another object of the present invention is to provide a starting material for the manufacture of glass ceramics of predetermined resistivity.

Another object of the present invention is to provide such glass ceramics of predetermined resistivity which are obtained from such a starting material by heating.

Other objects and advantageous features of the present invention will become apparent as the desription proceeds.

In principle these objects are achieved by providing a glass which is free of problems from the standpoint of glass technology and which is based on silver metaphosphate. If pure silver metaphosphate $AgPO_3$ is melted down, it solidifies readily and yields a brownish glass having a resistivity of $10^6\Omega$. cm. at 22° C. Its glass-technological and physical properties can be varied within wide limits by the addition of other metaphosphates and oxides.

In accordance with the present invention, the starting basic glass system consists of the three components silver metaphosphate $AgPO_3$, aluminum metaphosphate $Al(PO_3)_3$, and vanadium pentoxide $V_2O_5$. In addition to these essential components, other metaphosphates may also be present, for instance, barium metaphosphate $Ba(PO_3)_2$ or lead metaphosphate $Pb(PO_3)_2$. It is also possible to add barium oxide BaO or boron trioxide $B_2O_3$ as further components.

The silver containing, semiconductive glasses of high secondary emission and a resistivity of between $10^6$ and $10^{12}\Omega$. cm. are based on a glass which consists essentially of between about 10.0 % and about 80.0 %, by weight, of silver metaphosphate $AgPO_3$, between about 5.0 % and about 30.0 %, by weight, of aluminum metaphosphate $Al(PO_3)_3$, and between about 5.0 % and about 50.0 %, by weight, of vanadium pentoxide $V_2O_5$.

According to another embodiment of the present invention such glasses may also contain up to about 40.0 %, by weight, of barium metaphosphate $Ba(PO_3)_2$ or lead metaphosphate $Pb(PO_3)_2$ and, if required, up to about 6.0 %, by weight, of barium oxide BaO or up to about 3.0 %, by weight, of boron trioxide $B_2O_3$.

Preferred glasses according to the present invention are composed essentially as follows:

between about 25.0 % and about 80.0 %, by weight, of silver metaphosphate $AgPO_3$, between about 6.3 % and about 25.0 %, by weight, of aluminum metaphosphate $Al(PO_3)_3$, between about 10.0 % and about 40.0 %, by weight, of vanadium pentoxide $V_2O_5$, between about 0 % and about 30.0 %, by weight, of barium metaphosphate $Ba(PO_3)_2$, between about 0 % and about 24.6 %, by weight, of lead metaphosphate $(Pb(PO_3)_2$, between about 0 % and about 5.1 %, by weight, of barium oxide BaO, and between about 0 % and about 2.4 %, by weight, of boron trioxide $B_2O_3$.

Addition of minor quantities of other known additives to the basic glass system as they are conventionally used in glass technology, for instance, as flux, stabilizer, modifier, etc., is also within the scope of the present invention.

BRIEF DESCRIPTION OF THE DRAWINGS

The present invention will be described hereinafter more in detail whereby reference is made to the attached drawings, of which FIG. 1 schematically illustrates an electron multiplier channel in cross-sectional view.

DESCRIPTION OF THE PREFERRED EMBODIMENTS

Figure 1:
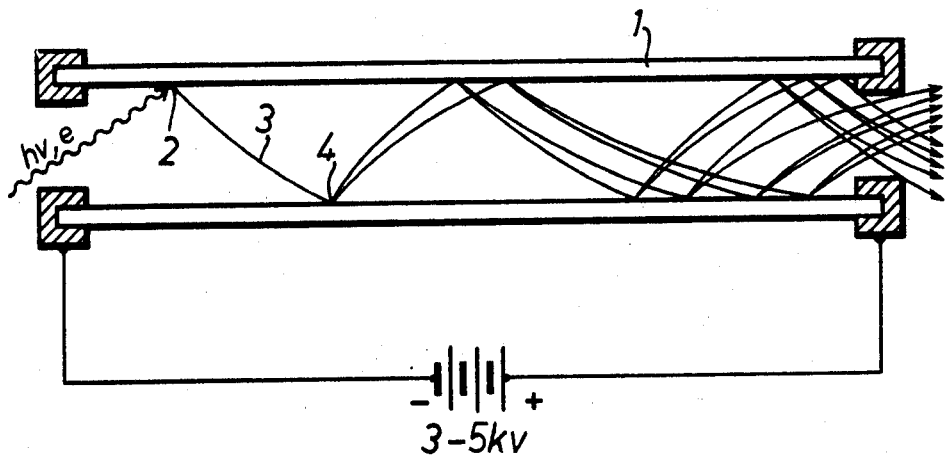

FIG. 1 shows an electron multiplier channel in cross-sectional view. Electromagnetic radiation, represented by the symbol "h.$\nu$", or, respectively, corpuscular radiation, represented by the symbol "$e$", which impinges on the inner wall of the cylindrical resistance tube 1, releases, at a first point 2, a secondary electron from the inner wall which consists of semiconductive material and which in its turn results in expelling secondary electrons at a second point 4 along the path of flight 3 shown in the drawing due to the direct current voltage of 3 to 5 kv. applied to the two ends of the tube; the secondary electrons in their turn produce new secondary electrons after a further path of flight, and so forth.

The diameter of such a channel is one to two powers of ten smaller than its length.

Figure 2:
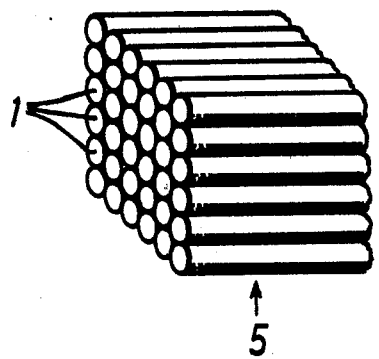
FIG. 2 is a schematic illustration of an electron multiplier channel plate.

FIG. 2 shows an electron multiplier channel plate 5 formed by sintering together, in parallel position to each other, a plurality of resistance tubes 1. These plates are used, as known, as image converter and image intensifier.

Figure 3:
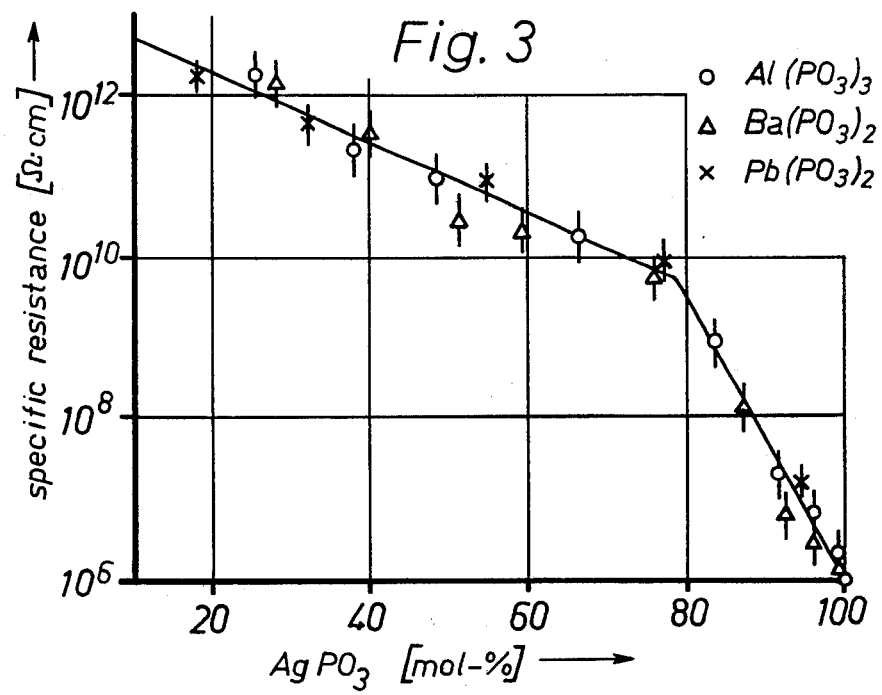
FIG. 3 is a graph showing the resistivity as a function of the $AgPO_3$ content.

In FIG. 3, the resistivity, measured in ($\Omega$. cm.), of three binary glass systems at 22° C. is shown, one component in each of the systems being silver metaphosphate $AgPO_3$, while the other component is $Al(PO_3)_3$ or $Ba(PO_3)_2$ or $Pb(PO_3)_2$. It is clear that the resistivity is dependent primarily on the content of $AgPO_3$ and can be varied within wide limits, in the present case between $10^6$ and $2 \cdot 10^{12}$ $\Omega$. cm.

If one proceeds from a binary to a ternary glass system, whereby one component in each case is silver metaphosphate $AgPO_3$, very similar conditions result. In Table 1 attached hereto, examples are given for the ternary systems $AgPO_3$—$Al(PO_3)_3$—$Ba(PO_3)_2$ and $AgPO_3$—$Al(PO_3)_3$—$Pb(PO_3)_2$.

Example 8 in said Table 1 with the highest content of $AgPO_3$ (72.9 %, by weight) has the lowest resistivity ($3.10^8$ $\Omega$. cm.) and Example 14 with the lowest $AgPO_3$ content (6.7 %, by weight) has the highest resistivity ($5 \cdot 10^{12} \Omega$. cm.).

By suitable variation of the proportions of the individual components, a large range for the individual resistivity values can be obtained. For a high secondary emission coefficient $\delta$, it has proven advantageous to use cesium metaphosphate $CsPO_3$ in addition to silver meta-phosphate $AgPO_3$ and aluminum metaphosphate $Al(PO_3)_3$ and to select the content of barium metaphosphate $Ba(PO_3)_2$ relatively high. Depending on the specific composition of the glass, barium metaphosphate $Ba(PO_3)_2$ and/or cesium metaphosphate $CsPO_3$ can be replaced in certain cases also by barium oxide BaO and/or cesium oxide $Cs_2O$, respectively.

Thus, while silver metaphosphate $AgPO_3$ is the predominant factor in determining the resistivity and while the addition of barium metaphosphate $Ba(PO_3)_2$ assures a high coefficient of secondary emission, the resistance to weathering of the glasses increases with an increase in the content of aluminum metaphosphate $Al(PO_3)_3$. Lead metaphosphate $Pb(PO_3)_2$ is intermediate between barium metaphosphate $Ba(PO_3)_2$ and aluminum metaphosphate $Al(PO_3)_3$ with respect to its effect on the secondary emission coefficient and the weathering properties of the glasses.

It follows from the preceding discussion that it is desirable first to proceed from the above indicated ternary systems in order to better adapt the glasses to the specific physical requirements and to reduce their tendency towards crystallization.

Figure 4:
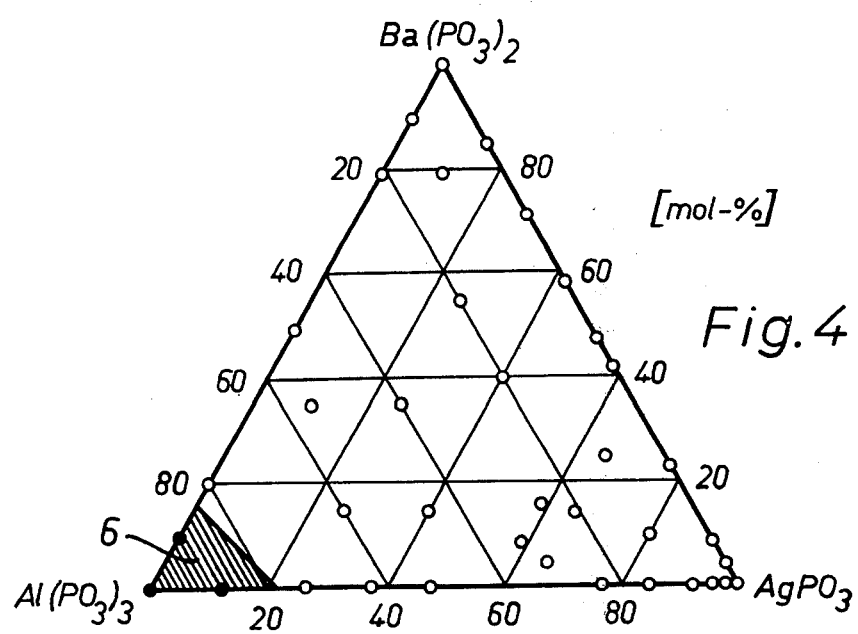
FIG. 4 diagrammatically illustrates the vitreous region in the system $AgPO_3$—$Ba(PO_3)_2$—$Al(PO_3)_3$.
Figure 5:
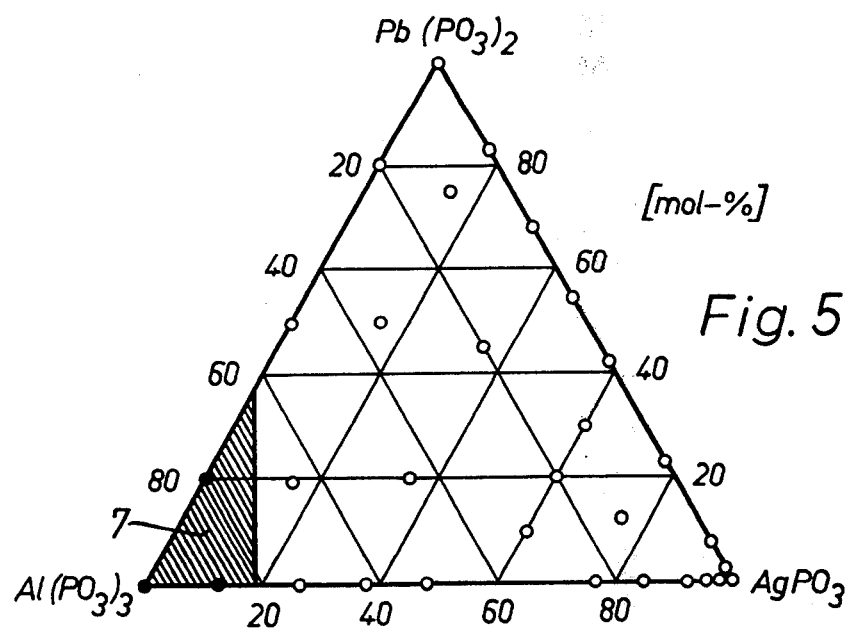
FIG. 5 diagrammatically illustrates the vitreous region in the system $AgPO_3$—$Pb(PO_3)_2$—$Al(PO_3)_3$.

FIGS. 4 and 5 show such ternary systems in diagrams for a 20 g. melt to be stirred down. The empty circles lie in all cases within the vitreous range, while the solid circles lie in the hatched crystallization regions 6 or 7, respectively. It is evident that glass-formation takes place practically over the entire region. By quenching the melts, this vitreous region can be widened considerably more. The two ternary systems indicated can be combined to form multiple systems, it being possible, for instance, also to add calcium metaphosphate $Ca(PO_3)_2$, beryllium metaphosphate $Be(PO_3)_2$, and magnesium metaphosphate $Mg(PO_3)_2$. The glass-forming properties of these three last-mentioned alkaline earth metal metaphosphates are, however, less good than those of the metaphosphates indicated in the illustrated ternary systems of FIGS. 4 and 5.

Surprisingly it has now been found that the metaphosphate systems mentioned above can be broadened in positive fashion by the addition of vanadium pentoxide $V_2O_5$. The addition of vanadium pentoxide $V_2O_5$ to the metaphosphates affords less problems than was to be expected, and yields glasses of a lower tendency towards crystallization than when melting down phosphorous pentoxide $P_2O_5$, vanadium pentoxide $V_2O_5$, and the other oxides. In addition to silver metaphosphate $AgPO_3$, there is thus provided a second component by means of which the resistivity of glasses according to the present invention can be predetermined and controlled.

Figure 6:
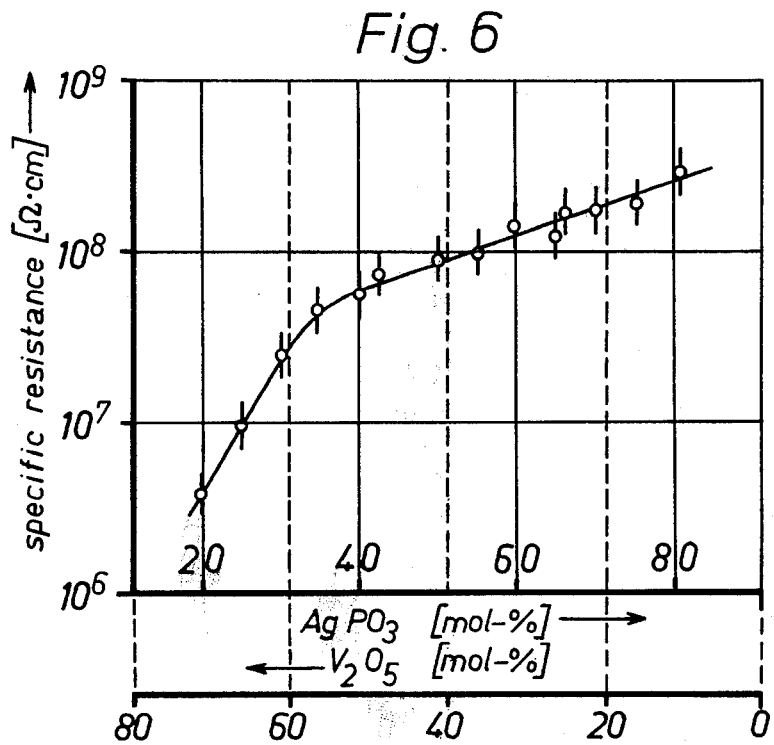
FIG. 6 is a graph showing the resistivity of a given glass as a function of partial replacement of $AgPO_3$ by $V_2O_5$.

FIG. 6 shows the change of the resistivity upon partial replacement of silver metaphosphate $AgPO_3$ by vanadium pentoxide $V_2O_5$. On the abscissa there is shown a first scale for the $AgPO_3$ content and below it a second scale staggered therefrom for the $V_2O_5$ content. This figure is specifically based on a glass having the composition 8.2 mol. % of aluminum metaphosphate $Al(PO_3)_3$ and 91.8 mol. % of silver metaphosphate plus vanadium pentoxide $(AgPO_3 + V_2O_5)$.

The values for the resistivity plotted as ordinates as a function of the corresponding ratio of silver metaphosphate to vanadium pentoxide $AgPO_3/V_2O_5$ were measured at 22° C. It can be seen that in this case the resistance decreases at first weakly but then strongly when the proportion of silver metaphosphate continuously decreases in favor of the proportion of vanadium pentoxide. Since in the case of silver metaphosphate electron conduction and ion conduction are to be expected, while in the case of vanadium pentoxide pure electron conduction is to be expected, the proportion of electronic conduction to the total conduction increases upon replacement of silver metaphosphate by vanadium pentoxide. On the other hand, increased addition of vanadium pentoxide increases the tendency towards crystallization. It is therefore advantageous to use silver metaphosphate and vanadium pentoxide together in order to obtain optimum, properly adjustable, physical and chemical properties of the glasses according to the present invention and particularly for an optical control of the resistivity values.

The constancy of the resistivity is of great practical importance for the intended use of the glasses according to the present invention as material for electron multiplier channels and plates. It has been found in this connection that pure silver metaphosphate glasses are unstable. An addition of barium metaphosphate $Ba(PO_3)_2$ and/or lead metaphosphate $Pb(PO_3)_2$ slightly improves their stability. An addition of aluminum metaphosphate $Al(PO_3)_3$ or a partial replacement of silver metaphosphate by vanadium pentoxide yields on the other hand glasses having a high constancy of resistivity.

Figure 7:
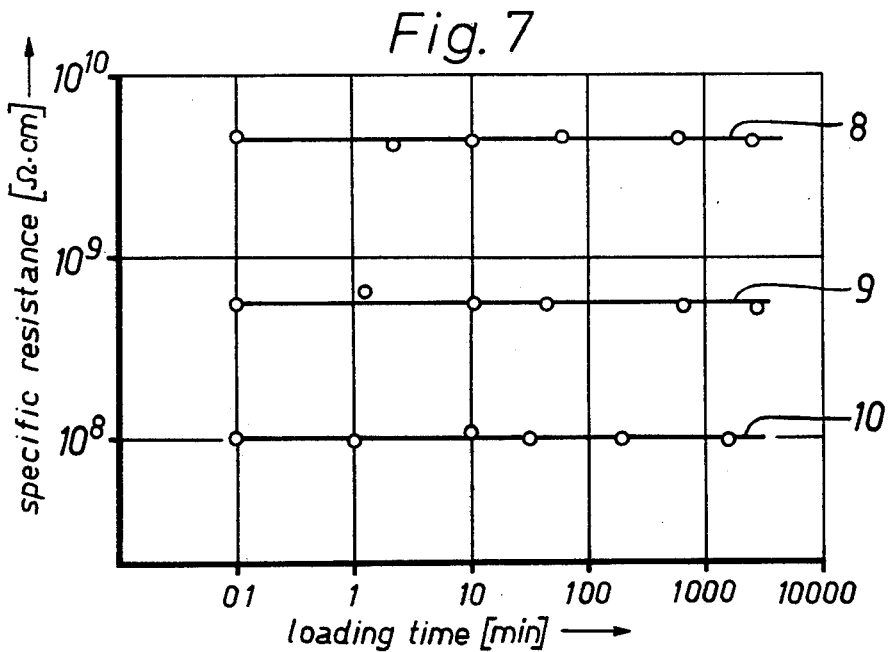
FIG. 7 is a graph showing the resistivity as a function of the time of load application.

FIG. 7 shows three examples. Even upon long-time exposure to load for up to 20 hours, the resistivity values change scarcely. The references numbers 8, 9, 10 in this FIG. refer to the glasses which are listed under the numbers 9, 10, 3 in attached Table 2.

Said Table 2 contains some of the glasses according to the present invention, there being also indicated their resistivity values, measured at 22° C., and in some cases their secondary emission coefficients for 300 ev energy and 90° incidence of the primary electrons.

The glasses according to the present invention are produced by melting in such a manner that the components mentioned are weighed out in the corresponding quantities and are melted down in a platinum or quartz crucible, for instance, in an electric furnace. It is of advantage, but by no means necessary, to maintain a slightly oxidizing atmosphere during melting. The melting time is between ½ hour and 1 hour, depending on the composition of the mixture selected in each case; the melting temperature is between about 1200° C. and about 1500° C. After melting, the melt is poured onto preheated metal plates and is roughly annealed. Capillaries are drawn from the resulting glasses by methods known per se.

When melting glasses according to the present invention which have a high silver content, glass ceramics are obtained by annealing, whereby the resistivity decreases. Since such an annealing treament can be carried out quite easily, it can be used for the planned establishing of a desired value of resistivity.

Figure 8:
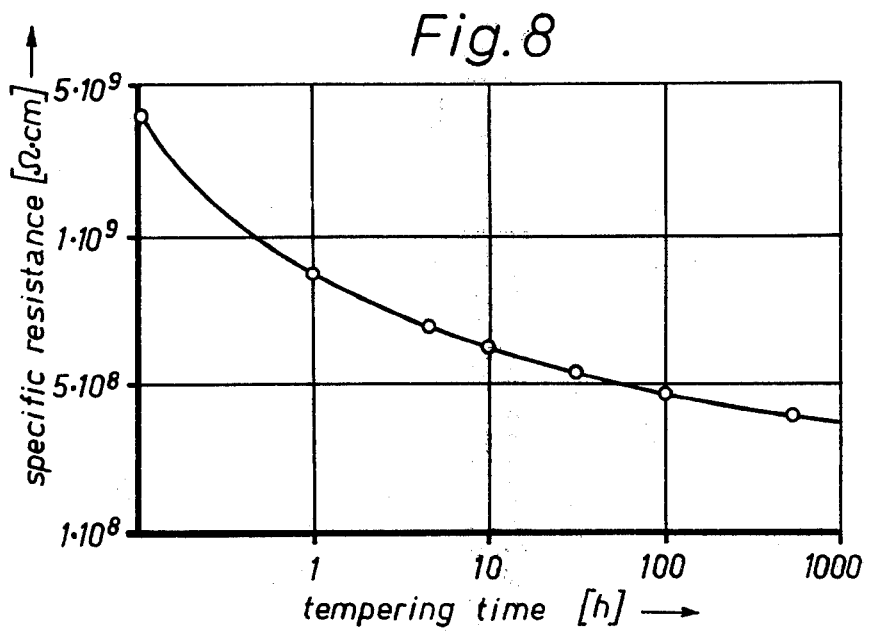
FIG. 8 is a graph showing the change in resistivity by heat treatment, i.e. annealing.

Thus FIG. 8 shows graphically the change in resistivity by a heat treatment at 200° C. as a function of the time of annealing indicated in hours. The plotted curve is obtained for a glass of the composition 55.0%, by weight, of silver metaphosphate $AgPO_3$,
5.0%, by weight, of aluminum metaphosphate $Al(PO_3)_3$, and
40.0%, by weight, of barium metaphosphate $Ba(PO_3)_2$. If it is desired, for instance, to obtain a value of resistivity of $5 \cdot 10^8$ Ω. cm., an annealing time of 100 hours and an annealing temperature of 200° C. must be maintained.

TABLE 1

| Example | $AgPO_3$ | $Al(PO_3)_3$ | (%, by weight) $Ba(PO_3)_2$ | $Pb(PO_3)_2$ | Color of the glass | Resistivity at 22° C. (Ω. cm.) |
|---|---|---|---|---|---|---|
| 1 | 56.6 | 36.6 | 6.8 | — | light yellow | $2 \cdot 10^{10}$ |
| 2 | 54.9 | 11.9 | 33.2 | — | light yellow | $1.2 \cdot 10^{10}$ |
| 3 | 55.7 | 24.1 | 20.2 | — | light yellow | $2.8 \cdot 10^{10}$ |
| 4 | 50.0 | 40.0 | 10.0 | — | dark brown | $7 \cdot 10^{10}$ |
| 5 | 50.0 | 30.0 | 20.0 | — | dark brown | $2.5 \cdot 10^{10}$ |
| 6 | 50.0 | 20.0 | 30.0 | — | light yellow | $1.5 \cdot 10^{10}$ |
| 7 | 50.0 | 10.0 | 40.0 | — | yellowish brown | $5 \cdot 10^{9}$ |
| 8 | 72.9 | 12.8 | 14.3 | — | light yellow | $3 \cdot 10^{8}$ |
| 9 | 31.6 | 49.8 | 18.6 | — | light yellow | $2 \cdot 10^{11}$ |
| 10 | 30.6 | 21.4 | 48.0 | — | light yellow | $4 \cdot 10^{11}$ |
| 11 | 18.8 | 63.5 | 17.7 | — | light yellow | $9 \cdot 10^{11}$ |
| 12 | 18.4 | 41.3 | 40.3 | — | light yellow | $8 \cdot 10^{11}$ |
| 13 | 17.9 | 20.2 | 61.9 | — | colorless Schlieren | $3 \cdot 10^{11}$ |
| 14 | 6.7 | 9.4 | 83.9 | — | colorless | $5 \cdot 10^{12}$ |
| 15 | 7.0 | 54.5 | 38.6 | — | colorless | $5 \cdot 10^{12}$ |
| 16 | 49.4 | 34.7 | — | 15.9 | light yellow | $2.5 \cdot 10^{10}$ |
| 17 | 47.3 | 22.1 | — | 30.6 | light yellow | $2.8 \cdot 10^{10}$ |

TABLE 1—Continued

| Example | AgPO$_3$ | Al(PO$_3$)$_3$ | Ba(PO$_3$)$_2$ | Pb(PO$_3$)$_2$ | Color of the glass | Resistivity at 22° C. (Ω. cm.) |
|---|---|---|---|---|---|---|
| | | | (%, by weight) | | | |
| 18 | 45.3 | 10.6 | — | 44.1 | light yellow | 4 . 10$^{10}$ |
| 19 | 63.5 | 11.9 | — | 24.6 | glass clear | 2 . 10$^{9}$ |
| 20 | 23.2 | 18.7 | — | 58.1 | light yellow | 3 . 10$^{10}$ |
| 21 | 25.6 | 46.1 | — | 28.3 | light yellow | 2 . 10$^{11}$ |
| 22 | 8.6 | 8.0 | — | 83.4 | light yellow | 3 . 10$^{12}$ |
| 23 | 9.3 | 30.5 | — | 60.2 | light yellow | 2 . 10$^{12}$ |
| 24 | 10.3 | 62.9 | — | 26.8 | light yellow | 1 . 10$^{12}$ |

TABLE 2

| No. | 25 | 26 | 27 | 28 | 29 | 30 | 31 | 32 | 33 | 34 | 35 |
|---|---|---|---|---|---|---|---|---|---|---|---|
| | | | | | (%, by weight) | | | | | | |
| AgPO$_3$ | 80.0 | 70.0 | 50.0 | 46.0 | 26.4 | 25.3 | 36.0 | 37.0 | 37.0 | 25.0 | 53.5 |
| Al(PO$_3$)$_3$ | 10.0 | 10.0 | 10.0 | 12.9 | 18.6 | 23.7 | 6.3 | 6.5 | 10.0 | 25.0 | 11.9 |
| V$_2$O$_5$ | 10.0 | 20.0 | 40.0 | 26.7 | 34.2 | 24.5 | 24.4 | 25.0 | 23.0 | 24.0 | 10.0 |
| Ba(PO$_3$)$_2$ | — | — | — | 14.4 | 20.8 | 26.5 | 28.2 | 29.1 | 30.0 | 26.0 | — |
| Pb(PO$_3$)$_2$ | — | — | — | — | — | — | — | — | — | — | 24.6 |
| BaO | — | — | — | — | — | — | 5.1 | — | — | — | — |
| B$_2$O$_3$ | — | — | — | — | — | — | — | 2.4 | — | — | — |
| Resistivity at 22°C (Ω. cm.) | 4.10$^8$ | 1.5.10$^8$ | 10$^8$ | 1.5.10$^8$ | 2.5.10$^8$ | 9.10$^8$ | 10$^9$ | 4.5.10$^9$ | 6.7.10$^9$ | 7.3.10$^8$ | 1.5.10$^9$ |
| Secondary emission coefficient δ | — | — | — | 2.5 | 2.6 | 2.7 | 3.3 | 3.2 | — | — | 2.2 |

We claim:

1. A silver-containing, semiconductive glass of high secondary emission and a resistivity between 10$^6$ and 10$^{12}$Ωcm., consisting essentially of silver metaphosphate, aluminum metaphosphate, and vanadium pentoxide within the following concentration limits:
between about 10.0% and about 80.0%, by weight, of silver metaphosphate AgPO$_3$,
between about 5.0% and about 30.0%, by weight, of aluminum metaphosphate Al(PO$_3$)$_3$, and
between about 5.0% and about 50.0%, by weight, of vanadium pentoxide V$_2$O$_5$.

2. The glass of claim 1, additionally containing an amount of a metaphosphate selected from the group consisting of barium metaphosphate Ba(PO$_3$)$_2$ and lead metaphosphate Pb(PO$_3$)$_2$ said amount being up to about 40%, by weight.

3. The glass of claim 1, additionally containing an amount of barium oxide BaO, said amount being up to about 6.0%, by weight.

4. The glass of claim 2, additionally containing an amount of barium oxide BaO, said amount being up to about 6.0%, by weight.

5. The glass of claim 1, additionally containing an amount of boron trioxide B$_2$O$_3$, said amount being up to about 3.0%, by weight.

6. The glass of claim 2, additionally containing an amount of boron trioxide B$_2$O$_3$, said amount being up to about 3.0%, by weight.

7. The glass of claim 1, consisting essentially of:
between about 25.0% and about 80.0%, by weight, of silver metaphosphate AgPO$_3$,
between about 6.3% and about 25.0%, by weight, of aluminum metaphosphate Al(PO$_3$)$_3$,
between about 10.0% and about 40.0%, by weight, of vanadium pentoxide V$_2$O$_5$,
between 0% and about 30.0%, by weight, of barium metaphosphate Ba(PO$_3$)$_2$,
between 0% and about 24.6%, by weight, of lead metaphosphate Pb(PO$_3$)$_2$,
between 0% and about 5.1%, by weight, of barium oxide BaO, and 8. Glass ceramics obtained by annealing the glass of claim 1.

9. Glass ceramics obtained by annealing the glass of claim 7.

10. An electron multiplier channel device made of the glass of claim 1.

11. An electron multiplier channel device made of the glass of claim 7.

12. An electron multiplier channel plate composed of glass capillaries made of the glass of claim 1.

13. An electron multiplier channel plate composed of glass capillaries made of the glass of claim 7.
between 0% and about 2.4%, by weight, of boron trioxide B$_2$O$_3$.

14. The glass of claim 2, wherein said barium metaphosphate Ba(PO$_3$)$_2$ is present in an amount between about 14.4% and 30% by weight, and said lead metaphosphate Pb(PO$_3$)$_2$ is present in an amount of about 24.6%, by weight.

15. The glass as defined by claim 3, wherein said barium oxide BaO is present in an amount of about 5.1%, by weight.

16. The glass of claim 4, wherein said barium oxide BaO is present in an amount of about 5.1%, by weight.

17. The glass of claim 5, wherein said boron trioxide B$_2$O$_3$ is present in an amount of about 2.4%, by weight.

18. The glass of claim 6, wherein said boron trioxide is present in an amount of about 2.4%, by weight.

19. The glass of claim 7, wherein said barium metaphosphate Ba(PO$_3$)$_2$ is present in an amount between about 14.4% and 30% by weight.

20. The glass of claim 1, wherein the secondary admission coefficient δ is greater than about 2.2.

* * * * *

UNITED STATES PATENT OFFICE
CERTIFICATE OF CORRECTION

Patent No. 3,912,522  Dated October 14, 1975

Inventor(s) HANS-HERBERT KAES and HANS STAADEN

It is certified that error appears in the above-identified patent and that said Letters Patent are hereby corrected as shown below:

Column 4, lines 20 and 21: The formula "Ag-$PO_3$-Al$(PO_3)_3$-Pb$(PO_3)_2$" should not be separated but should read: -- AgPO$_3$-Al$(PO_3)_3$-Pb$(PO_3)_2$ --.

Column 4, lines 64 and 65: The formula "Ca(-$PO_3)_2$" should not be separated but should read -- Ca$(PO_3)_2$ --.

Column 6, lines 45 and 46: The formula "Al(-$PO_3)_3$" should not be separated but should read -- Al$(PO_3)_3$ --.

Column 6, lines 2, 3, and 47, 48: The formula "Ba(-$PO_3)_2$ should not be separated but should read -- Ba$(PO_3)_2$ --.

Column 8, line 34: After "and" the sentence should be completed as follows:
-- between 0% and about 2.4%, by weight, of boron trioxide $B_2O_3$. --.

Column 8, lines 47 and 48: Cancel said lines.

Signed and Sealed this twenty-seventh Day of January 1976

[SEAL]

Attest:

RUTH C. MASON  
*Attesting Officer*

C. MARSHALL DANN  
*Commissioner of Patents and Trademarks*